United States Patent [19]
Murr et al.

[11] Patent Number: 5,966,953
[45] Date of Patent: Oct. 19, 1999

[54] WATER DISTRIBUTION AND RETURN CONTROL SYSTEM FOR EVAPORATIVE COOLING PAD INSTALLATION

[75] Inventors: James Murr, Muskogee, Okla.; Jack Edwin Ellison, Kennesaw, Ga.

[73] Assignee: Acme Engineering & Manufacturing Corporation, Muskogee, Okla.

[21] Appl. No.: 09/177,129

[22] Filed: Oct. 22, 1998

[51] Int. Cl.[6] .............................. F28D 3/00; F25D 17/00
[52] U.S. Cl. .................................. 62/171; 62/188; 261/27
[58] Field of Search .............................. 62/171, 18, 310, 62/188; 261/27

[56] References Cited

U.S. PATENT DOCUMENTS

| | | | |
|---|---|---|---|
| 4,031,180 | 6/1977 | Bohanon | 261/106 |
| 4,061,442 | 12/1977 | Clark et al. | 62/188 |
| 4,289,713 | 9/1981 | Goettl | 261/27 |
| 4,333,887 | 6/1982 | Goettl | 261/27 |
| 4,389,352 | 6/1983 | Bohanon, Sr. | 261/106 |
| 4,510,766 | 4/1985 | Curtis, Sr. | 62/171 |
| 4,576,013 | 3/1986 | Sperr et al. | 62/171 |
| 4,580,403 | 4/1986 | Hummel | 62/171 |
| 4,673,028 | 6/1987 | Meland | 165/19 |
| 4,994,211 | 2/1991 | Fuller | 261/97 |
| 5,121,770 | 6/1992 | Thompson | 137/312 |
| 5,192,464 | 3/1993 | Pawlowwski et al. | 261/27 |
| 5,588,303 | 12/1996 | Parks | 62/171 |

*Primary Examiner*—William Wayner
*Attorney, Agent, or Firm*—Staas & Halsey

[57] ABSTRACT

A multi-stage distribution and return control system for use in an evaporative cooling system including a drip conductor, a plurality of cooling cells along which water from the drip conductor passes and a gutter therebelow, including a tank, a conduit for conveying fresh water to the tank and a valve for regulating flow therethrough, a pump within the tank, a conduit for conveying water from the pump to the drip conductor, a conduit for conveying water from the gutter to the tank; high, mid and low-level switches and a float for movement between the switches, and a control system which when cooling is desired opens the valve for conveying fresh water to the tank until the float engages the mid-level switch and for starting the pump until the float engages the low-level switch, stopping the pump until water fills the tank again to the level defined by the mid-level switch and, moreover, when enough water is evaporated from the cooling cells, and the water level falls below the mid-level switch opening the valve again filling the tank to the level of the mid-level switch and, moreover, turning off the pump and valve when the temperature reaches the predetermined, desirable low level and, moreover, when water returning from the cooling cells is of sufficient volume to activate the high-level switch starting the pump until the float deactivates the low-level switch at which time the pump is turned off.

5 Claims, 2 Drawing Sheets

WATER DISTRIBUTION AND RETURN CONTROL SYSTEM FOR EVAPORATIVE COOLING PAD INSTALLATION

BACKGROUND AND SUMMARY OF THE INVENTION

The present invention relates to a water distribution and return control system for evaporative cooling pad installations of the type that are used, for example, in greenhouses, poultry houses, and livestock installations. Such evaporative cooling pad systems are usually installed within one or more of the walls of the building and utilize water soaked pads. The outside air is cooled as it passes into the building through the water soaked pads because of the vaporization of the water. A pump is employed to supply water at controlled rates to a drip conductor positioned above the pad. The water drips downwardly from the conductor through the pad soaking same. Simultaneously, exhaust fans installed within the walls of the building create a negative or partial pressure thereby causing outside air to pass through the water soaked pads into the building thereby effecting the desired cooling of the incoming air. Excess water is collected below the pad in a gutter or sump and thereafter pumped back to the drip conductor to continue the cooling operation. Originally, the pads which were used consisted of select-cut, high altitude grown aspen fibers formulated of desired density, texture and thickness and covered by plastic netting. For some time, however, the cooling pads have been constructed of cellulose paper impregnated with insoluble anti-rot salts. Such pad material is designed with a cross-fluted configuration which induces a high degree of turbulent mixing of water and air contributing to the evaporative efficiency. Additionally, the cross-fluted design of the pad material produces a strong, self-supporting pad structure which may be held firmly in place within the wall of the building. Examples of evaporative pad cooling systems such as described above include U.S. Pat. Nos. 4,389,352 and 4,031,180 of the Assignee of the present invention.

In evaporative cooling systems such as described above, water is used as the liquid being recirculated and evaporated. Water in excess of that required for the evaporation process per se, is needed to prevent scaling or salt build-up and to ensure that the evaporative cooling pads (media) are completely saturated. This excess water may be directed back to the holding tank or sump and recirculated along with fresh water as required for recirculation. Other systems supply water to the pad and thereafter direct the excess water off as waste or possibly use the water for other applications. In those systems which recirculate the water, potential problems exist, such as making provision for a large holding area for the returned and recirculating water, accommodating the build-up of minerals in the recirculated water due to the evaporation of the water and flushing of the minerals that are left back into the holding tank or sump, as well as algae growth in the holding tank and/or on the evaporative cooling pad material with resulting loss of efficiency due to mineral and/or algae build-up on the surface of the evaporative cooling pad material.

Evaporative cooling pad systems have typically employed large storage tanks or sumps, to accommodate the volume of water that was believed to be necessary for proper functioning of the entire system. The problem with large storage tanks is that the water remaining in the tank or sump after many days of operation becomes high in minerals due to the fact that the minerals in the water are not evaporated when the water in the cooling system is evaporated. Without dumping a percentage of the water, the excess mineral build-up will result in collection of minerals on the cooling pads and the eventual clogging of the pads. If water is drained off as the cooling system operates, the amount of water being drained can cause the surrounding areas to become muddy which can be a substantial inconvenience. In addition, large storage tanks also provide an ideal place for algae to grow. This algae can then spread to the cooling pads where it can clog the passages as well as producing permanent damage to the pad material. The solution to this serious problem inherent in existing systems is expensive chemicals to kill the algae in the storage tanks and in the cooling pads.

The evaporative cooling pad system of the present invention operates as a need-to-use filling system. The improved system disclosed herein recognizes that the evaporative rate of the pads is not nearly as large as the flow of water required over the pads. The system of the present invention does away with problems associated with large storage and return systems. Heretofore it was believed that storage systems were required to be quite large to make sure that there was enough water for the pump during start up and also when the system is shut down that there is enough capacity in the sump for return water from the pads.

The multi-stage distribution and return control system of the present invention eliminates the problems inherent with large storage tanks or sumps and instead uses a small sump tank. The capacity of the tank needs only to be large enough to start wetting the pads; thereafter a multi-level switch control supplies additional water when necessary. When the thermostat calls for cooling, a water valve is activated causing water to enter the sump tank until a float engages a mid-level switch. As long as the float is off the mid-level switch, the tank is continuously filled with water. As soon as the thermostat calls for cooling, the pump is activated unless the water level is below that defined by a low-level switch. The pumping operation continues until the water goes down to the point where the float disengages a low-level switch. When the low-level switch is deactivated, the pump is cut off until water fills the tank again to the mid-level mark defined by the mid-level switch. This movement back and forth from the mid-level to the low-level stabilizes as soon as the pads are totally wet. When enough water is evaporated from the pads for the water level to fall below the mid-level, the float engages the mid-level switch which activates the water valve and the tank is again filled to the mid-level point.

When the temperature of the building reaches its desirable low-level, the thermostat turns the cooling system off, i.e., the pump and the water valve are turned off. If the water returning from the pads is sufficient in volume to activate the high-level switch, a pump relay is activated which turns the pump back on. Power to the pump relay continues to be supplied through the low-level relay until the float deactivates the low-level switch at which time the pump is shut off. This wetting and stopping continues until enough water is evaporated in the pads to keep the water level in the sump tank below the high-level point.

In addition to the foregoing, there is integrated into the water distribution and return control system an automatic flush and dump system. At a pre-designated time, a flush selector switch is set on "auto" and the flush and dump cycle activated by a time clock. An auto flush relay is energized which activates the flush valve and the pump relay. The water remaining in the sump tank is pumped through the filter and out through the flush valve. This process carries the trash in the filter out the flush valve. Since the timing of the flush and drain cycle is set to occur when the thermostat has shut off the cooling system, the water valve does not come on. Water in the sump tank is pumped out until the float deactivates the low-level switch and shuts off the low-level relay. The dump valve is then energized through the low-level relay and the water remaining in the sump tank is drained out through the sump valve and related lines. A time clock then closes the dump valve at a predetermined interval. This process can be accomplished manually if the flush selector switch is turned to the "on" position.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
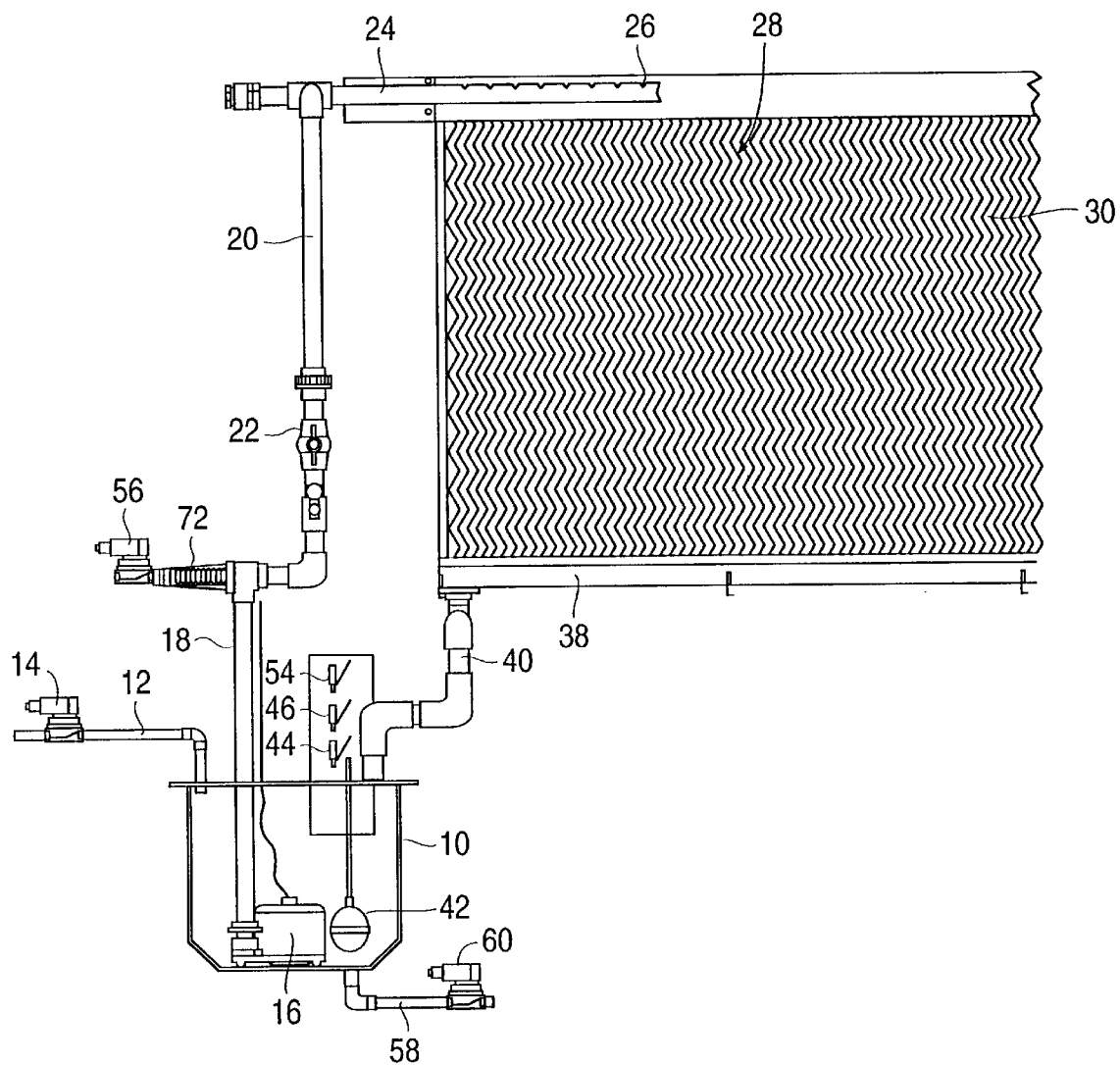
FIG. 1 is an elevational view of the evaporative cooling pad water distribution and return control system, including the small sump tank, multi-level switches, sump pump, fresh water valve, and related structures.

Reference is made to FIG. 1 which schematically depicts a portion of the evaporative cooling pad system. It will be apparent that there is provided a sump tank designated by the reference numeral 10 which is supplied with water through the conduit 12 which is provided with a valve 14 for controlling the flow of fresh water to the tank 10. Within the tank 10 is positioned a sump pump generally designated by the reference numeral 16 which conveys water through conduits 18 and 20 to a Tee which is connected to the drip conductor 24 which is provided with a plurality of openings, schematically designated by the reference numeral 26 throughout the length of the conductor 24. Cooling pad systems, as previously noted, are well known in the art and as schematically illustrated in FIG. 1, water is sprayed upwardly through the openings 26 and then passes downwardly throughout the pad 28 which is defined by the individual cooling cells 30, also well known in the art. Excess water from the pad 28 passes downwardly into the gutter 38 and is thereafter returned to the sump tank 10 through the conduit 40.

Figure 2:
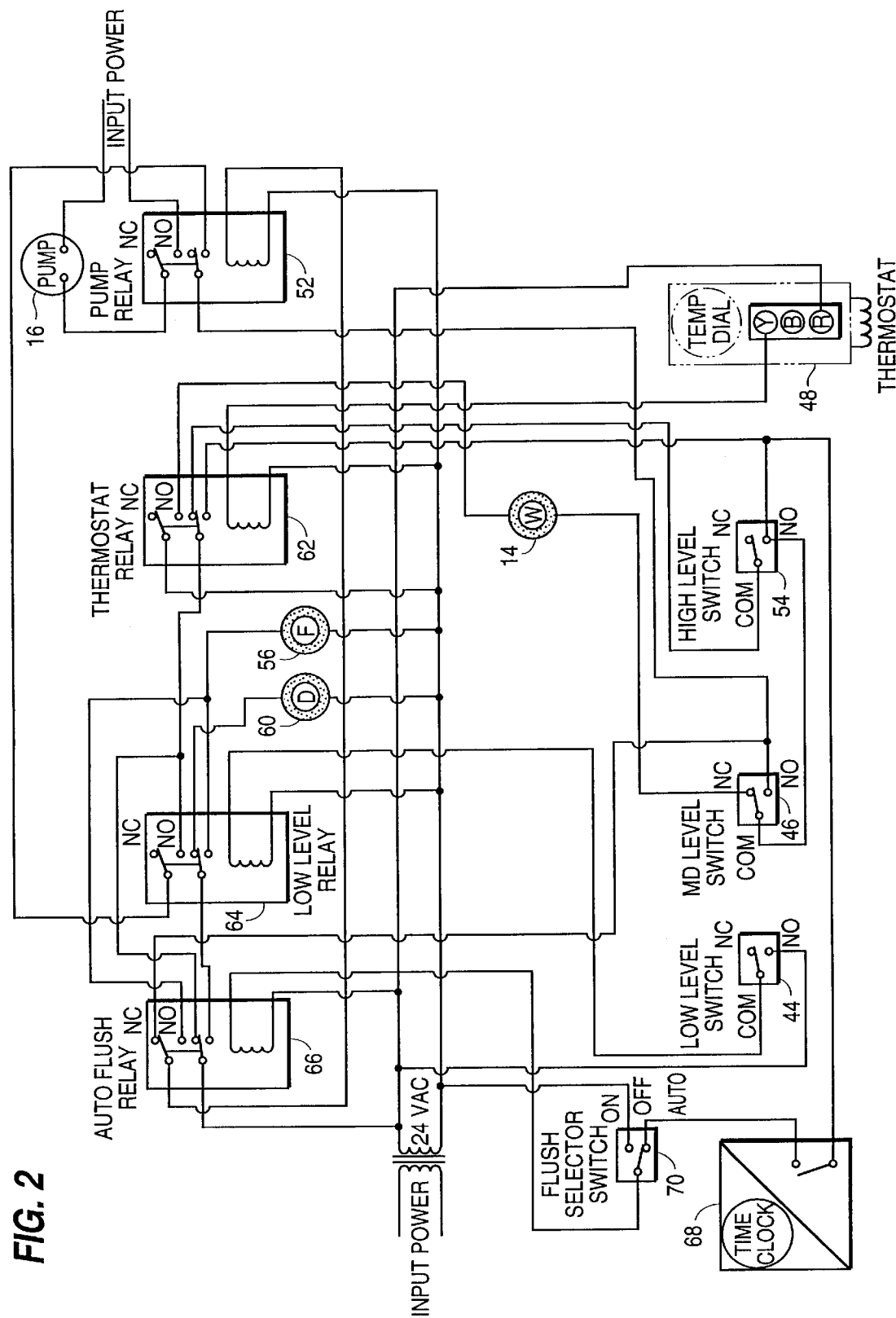
FIG. 2 is a wiring diagram depicting operation of the water valve, sump pump, thermostat, and multi-level switches.

Suitably mounted within the sump tank 10 is a float 42 arranged to sequentially engage a low-level switch 44, a mid-level switch 46 and a high-level switch 54. Such float and switch construction is well known in the art and, accordingly, only schematically illustrated in FIG. 1. The wiring diagram of FIG. 2 discloses the relationship between the low, mid and high-level switches 44, 46, and 54, respectively, and the sump pump 16 and fresh water valve 14. The operation of the water distribution and return control system will now be described.

When the thermostat 48 (FIG. 2) calls for cooling, the water valve 14 is activated causing fresh water to enter the tank 10 from the conduit 12 until the float 42 engages the mid-level switch 46. It will be apparent that as long as the float 42 is off the mid-level switch 46, the tank 10 is continuously filled with water. In addition, as the thermostat 48 calls for cooling, the pump 16 is activated through the pump relay switch 52 depicted in FIG. 2 unless the water level is below the low-level switch 44. The pumping operation continues until the water goes down to the point where the float 42 engages the low-level switch 44 and the low-level relay 64 is deactivated. When the low-level switch 44 is deactivated, the pump 16 is cut off until water fills the tank again to the mid-level mark defined by the mid-level switch 46. This movement, back and forth from the mid-level to low-level, stabilizes when the pads 28 are totally wet. When enough water is evaporated from the pads 28 for the water level to fall below the mid-level, the float 42 engages the mid-level switch 46 which activates the water valve 14 and the tank is again filled to the mid-level point.

When the temperature in the building reaches its desirable low-level, the thermostat 48 turns the cooling system off, i.e., the pump 16 and the water valve 14 are turned off. If the water returning from the pads 28 is sufficient in volume to activate the high-level switch 54, the pump relay 52 will be activated which turns the pump 16 on. Power to the pump relay 52 continues to be supplied through the low-level relay 64 until the float 42 deactivates the low-level switch 44 at which time the pump 16 shuts off. This wetting and stopping continues until enough water is evaporated in the pads 28 to keep the water level in the sump tank 10 below the high-level switch 54.

Integrated into this system is an automatic flush and dump system. At a pre-designated time, if the flush selector switch 70 is set on "auto", the flush and dump cycle is activated by the time clock 68. The auto flush relay 66 is energized which activates the flush valve 56 and the pump relay 52. The water remaining in the sump tank 10 is pumped though the filter 72 and out the flush valve 56. This process carries the trash in the filter 72 out the flush valve 56. Since the timing of the flush and drain cycle should be set to occur when the thermostat has the cooling system shut off, the water valve 14 does not come on. The water in the sump tank 10 is pumped out until the float 42 deactivates the low-level switch 44 and shuts off the low-level relay 64. The dump valve 60 is then energized through the low-level relay 64 and the water remaining in the sump tank 10 is drained out through the sump valve 60 and the drain line 48. The time clock 68 will then close the dump valve 60 after a predetermined amount of time. This process can also be accomplished manually if the flush selector switch 70 is turned to the "on" position.

What is claimed is:

1. In an evaporative cooling system including a drip conductor, a plurality of cooling cells along which water from the drip conductor passes and a gutter therebelow, the improvement comprising:

a tank, a conduit for conveying fresh water to the tank and a valve for regulating flow therethrough, a pump within the tank, a conduit for conveying water from the pump to the drip conductor, a conduit for conveying water from the gutter to the tank, high, mid and low-level switches associated with the tank and a float for movement between the switches; and means, when cooling is desired, for opening the valve for conveying fresh water to the tank and for operating the pump conveying water to the drip conductor until the float engages the low-level switch, stopping the pump until water fills the tank again to the level defined by the mid-level switch and, moreover, when enough water is evaporated from the cooling cells and the water level falls below the mid-level switch at which time the float engages the mid-level switch opening the valve again filling the tank to the level of the mid-level switch and, moreover, turning off the pump and valve when the temperature reaches the predetermined desirable low level and, moreover, when water returning from the cooling cells is of sufficient volume to activate the high-level switch starting the pump until the float deactivates the low-level switch at which time the pump is turned off.

2. In an evaporative cooling system as in claim 1, further comprising:

a flush selector switch, a flush valve and a filter operatively connected to the pump and conduit for conveying water from the pump to the drip connector, and a dump valve for regulating the flow of water through a drain line from the tank; and means for activating the flush and dump cycle for energizing the flush valve, pumping the water remaining in the tank through the filter and out through the flush valve, until the float deactivates the low-level switch energizing the dump valve draining the water remaining in the tank and, thereafter, closing the dump valve.

3. A multi-stage distribution and return control system for use in an evaporative cooling system, comprising:

a tank, a valve for controlling the introduction of fresh water to the tank, a pump within the tank, first and second multi-level switches within the tank, a float for movement within the tank for actuating the switches, means responsive to temperature for activating the pump when cooling is desired and for deactivating the pump and for closing the valve when cooling is no longer necessary, means for deactivating the pump when the float activates the first of said switches, and means for opening the valve when the float activates the second of the switches.

4. A multi-stage distribution and return control system for use in an evaporative cooling system as in claim 3, further comprising:

a third switch and means for turning the pump on when the water level causes the float to activate the third switch.

5. A multi-stage distribution and return control system for use in an evaporative cooling system as in claim 4, further comprising:

a flush selector switch, a flush valve and a filter operative connected to the pump and conduit for conveying water from the pump to the drip connector, and a dump valve for regulating the flow of water through a drain line from the tank; and means for activating the flush and dump cycle for energizing the flush valve, pumping the water remaining in the tank through the filter and out through the flush valve, until the float deactivates the lowest of the switches energizing the dump valve draining the water remaining in the tank and, thereafter, closing the dump valve.

* * * * *